United States Patent
Loewen et al.

(10) Patent No.: US 9,921,113 B2
(45) Date of Patent: Mar. 20, 2018

(54) FIBER OPTIC TEMPERATURE SENSING SYSTEM AND METHOD UTILIZING BRILLOUIN SCATTERING FOR LARGE, WELL-VENTILATED SPACES

(71) Applicants: Eric P. Loewen, Wilmington, NC (US); Brett J. Dooies, Wilmington, NC (US); Seth Ryan Paul Strege, Wilmington, NC (US); Nicholas Francis O'Neill, Wilmington, NC (US)

(72) Inventors: Eric P. Loewen, Wilmington, NC (US); Brett J. Dooies, Wilmington, NC (US); Seth Ryan Paul Strege, Wilmington, NC (US); Nicholas Francis O'Neill, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 593 days.

(21) Appl. No.: 14/338,918

(22) Filed: Jul. 23, 2014

(65) Prior Publication Data

US 2016/0027537 A1  Jan. 28, 2016

(51) Int. Cl.
*G01J 5/08* (2006.01)
*G01K 11/32* (2006.01)
(Continued)

(52) U.S. Cl.
CPC .............. *G01K 11/32* (2013.01); *G01K 1/026* (2013.01); *G21D 3/04* (2013.01); *G01K 2011/322* (2013.01); *Y02E 30/40* (2013.01)

(58) Field of Classification Search
CPC ....................................................... G01J 5/08
(Continued)

(56) References Cited

U.S. PATENT DOCUMENTS 3,465,326 A * 9/1969 Weir ........................ G01P 1/106
324/161
4,114,442 A * 9/1978 Pratt ....................... G01K 1/026
374/113
(Continued)

FOREIGN PATENT DOCUMENTS

CN 2020420324 U * 11/1911
CN 201297269 Y * 8/2009
ZA 8202981 A * 1/1983

OTHER PUBLICATIONS

Thompson et al. "Stochastic, Spatiotemporal Intensity Dynamics of Stimulated Brillouin Scattering in a Two-Mode Optical Fiber" Optical Society of America, vol. 30, No. 10, Oct. 2013.
(Continued)

*Primary Examiner* — Gail Kaplan Verbitsky
(74) *Attorney, Agent, or Firm* — Harness, Dickey & Pierce, P.L.C.

(57) ABSTRACT

A temperature change detection apparatus for monitoring temperature change in various portions of a large space includes a trip logic unit configured to execute a trip operation based on receipt of a trip signal at the trip logic unit; a plurality of temperature sensors each including a sensing portion composed of optical fiber cable and each being configured to generate light information indicating an amount of Brillouin scattering that occurs within the sensing portion; a plurality of monitoring units configured such that each monitoring unit determines a temperature value corresponding to each temperature sensor connected to the monitoring unit based on an amount of Brillouin scattering indicated by the light information generated by each of the connected temperature sensors, an each monitoring unit generates a trip signal when a determined temperature value exceeds a running average by more than a threshold amount.

14 Claims, 7 Drawing Sheets

(51) Int. Cl.
*G21D 3/04* (2006.01)
*G01K 1/02* (2006.01)

(58) Field of Classification Search
USPC ....... 374/137, 130, 131, 141, 152, 110, 112, 374/115, 102, 166; 356/43, 44
See application file for complete search history.

(56) References Cited

U.S. PATENT DOCUMENTS

| | | | | |
|---|---|---|---|---|
| 4,525,763 | A * | 6/1985 | Hardy | G01R 31/343 318/472 |
| 4,602,872 | A * | 7/1986 | Emery | G01K 3/02 310/53 |
| 4,755,668 | A * | 7/1988 | Davis | G01K 1/026 250/227.27 |
| 4,931,896 | A * | 6/1990 | LeCourt | H02H 3/07 361/73 |
| 5,115,371 | A * | 5/1992 | Tripodi | H02H 6/00 335/44 |
| 6,079,874 | A * | 6/2000 | Hegedus | C23C 16/481 118/725 |
| 6,286,992 | B1 * | 9/2001 | Kyrtsos | G01K 13/00 374/104 |
| 6,813,403 | B2 * | 11/2004 | Tennyson | G01D 5/35383 250/227.11 |
| 6,910,803 | B2 | 6/2005 | MacDougall | |
| 8,051,276 | B2 * | 11/2011 | Krieger | G06F 1/206 712/220 |
| 8,322,919 | B2 | 12/2012 | Lagakos et al. | |
| 8,520,195 | B2 | 8/2013 | Ramos et al. | |
| 8,584,519 | B2 | 11/2013 | Maida et al. | |
| 8,643,716 | B1 | 2/2014 | Kalokitis et al. | |
| 8,845,188 | B2 * | 9/2014 | Bash | G01K 1/026 374/1 |
| 2006/0173645 | A1 * | 8/2006 | Floyd | G01K 7/32 702/130 |
| 2006/0204164 | A1 * | 9/2006 | Ivtsenkov | G01D 5/35383 385/12 |
| 2008/0084002 | A1 * | 4/2008 | Raben | B29C 35/0288 264/40.1 |
| 2008/0279576 | A1 * | 11/2008 | Kim | G03G 15/2039 399/69 |
| 2010/0054298 | A1 * | 3/2010 | Sasaoka | G01K 11/32 374/1 |
| 2011/0044373 | A1 * | 2/2011 | Lagakos | G01K 5/62 374/188 |
| 2011/0052115 | A1 * | 3/2011 | Lee | G01R 15/247 385/12 |
| 2011/0280277 | A1 * | 11/2011 | Chung | G01K 11/32 374/137 |
| 2012/0039356 | A1 * | 2/2012 | Adams | G01K 7/00 374/155 |
| 2012/0293806 | A1 * | 11/2012 | Cranch | G01D 5/35383 356/477 |
| 2013/0090867 | A1 | 4/2013 | Strong | |
| 2013/0170991 | A1 * | 7/2013 | Olesen | B29C 65/4835 416/61 |
| 2013/0259088 | A1 * | 10/2013 | Bellis | G01K 1/026 374/138 |
| 2014/0077623 | A1 * | 3/2014 | Colleran | H02J 4/00 307/116 |
| 2014/0153611 | A1 * | 6/2014 | Kasajima | G01K 11/32 374/130 |
| 2016/0249836 | A1 * | 9/2016 | Gulati | A61B 5/1455 |

OTHER PUBLICATIONS

Thompson et al. "Correlations Between Intensity Fluctuations Within Stimulated Brillouin Waveforms Generated by Scattering of Q-Switched Pulses in Optical Fiber" Optics Communications, 242, (2004), pp. 267-278.

* cited by examiner

FIBER OPTIC TEMPERATURE SENSING SYSTEM AND METHOD UTILIZING BRILLOUIN SCATTERING FOR LARGE, WELL-VENTILATED SPACES

BACKGROUND

1. Field

This disclosure relates generally to monitoring temperature in large spaces.

2. Description of Related Art

Nuclear power plants, including for example boiling water reactor (BWR) or an economic simplified BWR (ESBWR) plants, generate power from steam using turbines. Turbines in a nuclear power plant may be housed in a large structure referred to, for example, as a turbine building. Sharply rising temperatures in the turbine building may be indicative of dangerous and/or abnormal conditions that require attention in order to prevent safety hazards.

SUMMARY

At least some example embodiments provide a temperature change detection apparatus for monitoring temperature change in various portions of a first space, the temperature change detection apparatus including a trip logic unit configured to execute a trip operation based on receipt of a trip signal at the trip logic unit; a plurality of temperature sensors being configured such that, for each of the plurality of temperature sensors, the temperature sensor includes a sensing portion composed of optical fiber cable and the temperature sensor is configured to generate light information indicating an amount of Brillouin scattering that occurs within the sensing portion; a plurality of monitoring units configured such that, for each one of the plurality of monitoring units, the monitoring unit is, connected to temperature sensors from among the plurality of temperature sensors, configured to, for each of the temperature sensors to which the monitoring unit is connected, determine a temperature value corresponding to the connected temperature sensor based on an amount of Brillouin scattering indicated by the light information generated by the connected temperature sensor, the determined temperature value being indicative of a temperature at a location of the sensing portion of the connected temperature sensor, and generate a comparison result based on the determined temperature value and a running average value, and configured to generate the trip signal when at least one of the generated comparison results exceeds a threshold value.

According to at least one example embodiment, the plurality of temperature sensors and the plurality of monitoring units are divided into a plurality of safety divisions such that each safety division includes a different one of the plurality of monitoring units and a different group of temperature sensors from among the plurality of temperature sensors.

According to at least one example embodiment, the trip logic unit is configured such that the trip logic unit executes the trip operation when a total number of trip signals received from the monitoring devices of the plurality of safety divisions exceeds a trip threshold value.

According to at least one example embodiment, for each of the safety divisions, the group of temperature sensors included in the safety division are located, respectively, in a plurality of monitoring areas, the plurality of monitoring areas being located in spatially different areas of the first space.

According to at least one example embodiment, the plurality of temperature sensors are arranged such that, for each of the plurality of monitoring areas, the monitoring area includes at least one temperature sensor from each of the groups of temperature sensors.

According to at least one example embodiment, the optical fiber cable of a temperature sensor, from among the plurality of temperature sensors, includes a large fiber section and a small fiber section, a cross-sectional diameter of the small fiber section being smaller than that of the large fiber section, the small fiber section corresponding to the sensing portion of the optical fiber cable, the large fiber section corresponding to portions of the optical fiber cable other than the sensing portion.

According to at least one example embodiment, the sensing portion of the optical fiber of at least one of the plurality of temperature sensors includes a plurality of protrusions that extend outwards from the optical fiber cable and are configured to increase an amount of ambient heat delivered from the monitoring area in which the sensing portion is located to the sensing portion.

At least some example embodiments provide a nuclear plant system including a turbine building including one or more turbines configured to generate power from steam produced by a boiling water reactor (BWR); and the temperature change detection apparatus, wherein the first space is the turbine building, the sensing portions of the plurality of temperature sensors are located in a plurality of monitoring areas, the plurality of monitoring areas being spatially distributed in different locations throughout the turbine building, and the trip operation includes closing one or more valves.

According to at least one example embodiment, the trip operation includes closing a main steam isolation valve (MSIV) of the turbine building.

According to at least one example embodiment, the plurality of temperature sensors and the plurality of monitoring units are divided into a plurality of safety divisions such that each safety division includes a different one of the plurality of monitoring units and a different group of temperature sensors from among the plurality of temperature sensors.

According to at least one example embodiment, the trip logic unit is configured such that the trip logic unit executes the trip operation when a total number of trip signals received from the monitoring devices of the plurality of safety divisions exceeds a trip threshold value.

According to at least one example embodiment, for each of the safety divisions, the group of temperature sensors included in the safety division are located, respectively, in the plurality of monitoring areas.

According to at least one example embodiment, the plurality of temperature sensors are arranged such that, for each of the plurality of monitoring areas, the monitoring area includes at least one temperature sensor from each of the safety divisions.

According to at least one example embodiment, the optical fiber cable of a temperature sensor, from among the plurality of temperature sensors, includes a large fiber section and a small fiber section, a cross-section diameter of the small fiber section being smaller than that of the large fiber section, the small fiber section corresponding to the sensing portion of the optical fiber cable, the large fiber section corresponding to portions of the optical fiber cable other than the sensing portion.

According to at least one example embodiment, the sensing portion of the optical fiber of at least one of the plurality of temperature sensors includes a plurality of protrusions that extend outwards from the optical fiber cable and are configured to increase an amount of ambient heat delivered from the monitoring area in which the sensing portion is located to the sensing portion.

According to at least one example embodiment, the turbine building includes at least one ventilation conduit configured to carry at least one of air and other gases into or out of the turbine building, and the sensing portion of at least one of the plurality of temperature sensors is located on an interior or exterior surface of the ventilation conduit.

At least some example embodiments provide a method of monitoring temperature change in first space including a plurality of monitoring areas, the method including generating, for a first time interval, first temperature values indicative of the temperatures of the plurality of monitoring areas based on light information generated by a plurality of temperature sensors located in the plurality of monitoring areas, the plurality of temperature sensors being fiber optic Brillouin scattering temperature sensors, the plurality of temperature sensors being divided between a plurality of safety divisions; determining, for each of the plurality of safety divisions, a first mean value corresponding to the first time interval by performing an averaging operation on the first temperature values generated by temperature sensors of the safety division; updating, for each of the plurality of safety divisions, a running average value, by performing an averaging operation on the first mean value and a plurality of earlier mean values generated, respectively, for a plurality of time intervals that precede the first time interval and fall within a sliding window; performing a comparison operation based on the first temperature values of each of the plurality of safety divisions and the running average value, performing a first determination operation including, determining, based on the comparison operation, that one or more of the safety divisions are indicated safety divisions, each indicated safety divisions being a safety division that includes at least one temperature sensor that generated a first temperature value that exceeds the running average value by more than a threshold amount, and generating a trip indication for each of the one or more indicated safety divisions, respectively; and executing a trip operation based on the first determination operation.

According to at least one example embodiment, the executing a trip operation includes performing a second determination operation including determining whether the number of generated trip indications exceeds a trip threshold; and executing the trip operation when the second determination operation indicates that the number of trip indications exceeds the trip threshold.

According to at least one example embodiment, the method further includes performing a validation operation including, for each of the plurality of safety divisions, determining whether a number of operating temperature sensors included in the safety division, from among the plurality of temperature sensors, exceeds a threshold sensor number, and preventing the generation of the trip indication for the safety division when the number of operating temperature sensors included in the safety division does not exceed the threshold sensor number.

According to at least one example embodiment, the first space is a turbine building including one or more turbines configured to generate power from steam produced by a boiling water reactor (BWR), and the trip operation includes closing a main steam isolation valve (MSIV) of the turbine building.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

Overview of Temperature Detection Apparatus and Method

Modern nuclear reactors use a variety of digital systems for both control and safety. These systems must be redundant, diverse, fault tolerant and extensive in self-diagnosis while the system is in operation. As is discussed above, a sharp rise in temperature in the large turbine building of a nuclear power plant may be indicative of a dangerous or abnormal event. One such event that poses a safety concern is a steam leak within the turbine building. One way to respond to a steam leak is automatic closure of the main steam isolation valve (MSIV), leading to a reactor Scram. For plant reliability, it is important that the steam leak detection and isolation system is reliable, while acting independently to successfully detect the steam leak and shut down the reactor.

One method of detecting sharp changes in temperature, which may be indicative of conditions like steam leaks, involves using the Brillouin scattering phenomenon. Brillouin scattering will be discussed in greater detail below. Next, some examples of Brillouin scattering temperature sensors will be discussed in greater detail with reference to FIGS. 2A-4. Next, some examples of structures and methods corresponding to a protection system that uses the outputs of the Brillouin scattering temperature sensor to detect sharp temperature rises in large spaces and to respond by executing corrective measures will be discussed with reference to FIGS. 5-7.

Brillouin Scattering

Brillouin scattering is a well-known physical phenomenon that occurs when light in a medium interacts with time-dependent optical density variations and changes its energy (frequency) and path. The density variations may be due to acoustic modes, such as phonons, magnetic modes, such as magnons, or temperature gradients. As described in classical physics, when the medium is compressed, the index of refraction of the medium changes, and a fraction of the traveling light wave—interacting with the periodic refraction index variations—is deflected in a three-dimensional diffraction grating. Since the sound wave, too, is traveling, light is also subjected to a Doppler shift, so frequency of the light changes.

Figure 1:
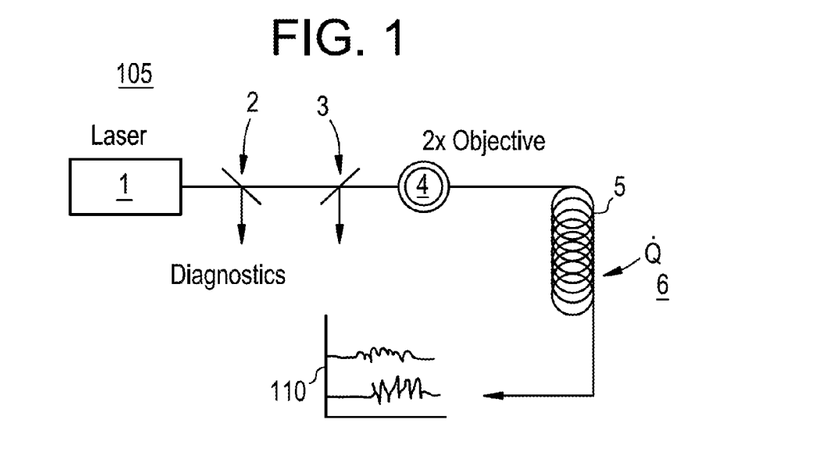
FIG. 1 is a diagram illustrating an example structure of a laser system that uses Brillouin scattering.

FIG. 1 illustrates an example of a laser system 105 that uses Brillouin scattering. As is illustrated in FIG. 1, the laser system 105 may include a laser 1, mirrors 2 and 3, lens 4 and an optical fiber cable 5. As is illustrated in FIG. 1, laser light 1 is irradiated through mirrors 2 and 3 and lens 4 and into an optical fiber cable 5. Light reflected from the mirror 2 and light reflected from the mirror 3 may be used to perform diagnostics. Further, the lens 4 may be a 2× objective lens. The transfer of heat Q 6 to the optical fiber cable 5 results in the production of phonons within the optical fiber cable 5 which produces scattering in the optical fiber cable. This scattering is called Brillouin Scattering. Wave forms 110 illustrate example plots of light intensity over time with respect to light that exits the optic cable 5 after Brillouin Scattering occurs. Accordingly, Brillouin scattering can be detected by analyzing the characteristics of light that is reflected by or transmitted through a medium in which Brillouin Scattering occurs using known methods.

Changes in the characteristics of light that is scattered as a result of Brillouin scattering, for example changes in the power, intensity, wavelength or frequency of the scattered light compared to the original incident light, may be referred to as Brillouin gain. Brillouin gain is temperature dependent since the phonons that scatter the light are thermally generated. As a result of the relationship between temperature and Brillouin gain, by measuring Brillouin gain, the temperature of an area surrounding the medium that caused the Brillouin gain may be detected according to known methods.

According to at least some example embodiments, there are at least two methods for measuring the occurrence of Brillouin scattering: analyzing laser depletion and analyzing back scatter. Examples of temperature monitoring devices that use laser depletion and temperature monitoring devices that use back scatter will now be discussed below with reference to FIGS. 2A, 2B, 3A and 3B.

Example Brillouin Scattering Temperature Sensors

Figure 2A:
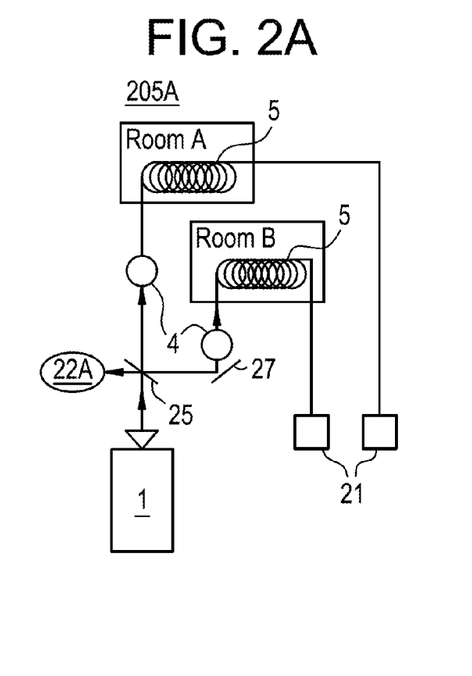
FIG. 2A is a diagram illustrating an example structure of a laser depletion type temperature sensor.
Figure 2B:
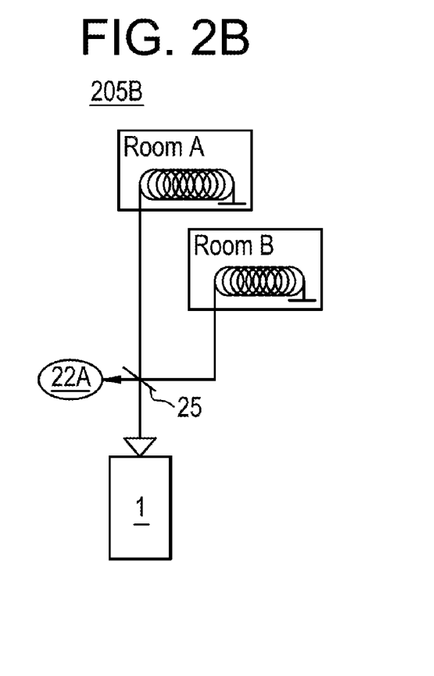
FIG. 2B is a diagram illustrating an example structure of a back scatter type temperature sensor.

FIG. 2A is a diagram illustrating an example structure of a laser depletion type temperature sensor 205A, and FIG. 2B is a diagram illustrating an example structure of a back scatter type temperature sensor 205B.

As will be discussed in greater detail below, the laser depletion type temperature sensor 205A may detect temperature by analyzing characteristics of light that has been depleted or reduced as a result of portion of the light initially irradiated into an optical fiber cable being reflected by the optical fiber cable due to Brillouin scattering. Referring to FIG. 2A, the laser depletion type temperature sensor 205A may include a laser 1, lenses 4, a beam splitter 25, a mirror 27, optical fiber cables 5, and signal receivers 21. The temperature monitoring device may 205A may monitor two rooms, room A and room B, using first and second paths, respectively. As is illustrated in FIG. 1, laser light generated by the laser is incident on the beam splitter 25 which splits the incident light into three signals including a diagnostic signal 22A, a signal traveling via lens 4 and optical fiber cable 5 on a first path through room A to the receiver 21 of the first path, and a signal traveling via lens 4 and optical fiber cable 5 on a second path through room B to the receiver 21 of the second path. Thus, if the temperature in room A is higher than the temperature necessary to cause Brillouin scattering in light passing through the optical fiber cable 5 in room A, Brillouin scattering will occur and the light received at receiver 21 of the first path will be different from the light emitted from the laser 1 as a result.

For example, characteristics of light that reaches the receiver 21 of the first path may be reduced or depleted due to portions of the original light emitted by laser 1 being reflected by the optical fiber cable 5 as a result of Brillouin scattering. The light originally emitted from the laser 1 may be output as the diagnostic signal 22A and analyzed. Next, the characteristics of the depleted light received at receiver 21 of the first path can be compared to the characteristics of the light emitted by laser 1 to determine differences in the two characteristics. Since these light characteristics differences can result from Brillouin scattering, and Brillouin scattering is temperature dependent, a temperature of room A can be detected based on the characteristics differences.

Further, in the same manner discussed above with reference to room A, by analyzing the light characteristic differences between the light received at receiver 21 of the second path and the corresponding light initially emitted by the laser 1, the temperature of room B can be detected.

The back scatter type temperature sensor 205B is similar to the laser depletion type temperature sensor 205A in terms of structure and operation. However, as will be discussed in greater detail below, the laser depletion type temperature sensor 205A detects temperature by analyzing characteristics of light that has been reflected, or back scattered, by an optical fiber cable due to Brillouin scattering. Referring to FIG. 2B, the back scatter type temperature sensor 205B may include a laser 1, optical fiber cables 5, and a beam splitter 25 which splits light incident on the beam splitter 21 into first and second paths associated, respectively, with rooms A and B. Like the laser depletion type temperature sensor 205A, the first path of the back scatter type temperature sensor 205B may include a lens 4 (not illustrated), and the second path of the back scatter type temperature sensor 205B may include a lens 4 and a mirror 27 (not illustrated). Thus, like the laser depletion type temperature sensor may 205A, the back scatter type temperature sensor 205B may monitor both rooms A and room B, using two respective paths. However, the back scatter type temperature sensor 205B differs from the laser depletion type temperature sensor may 205A in that, instead of measuring the reduced or depleted characteristics of light that passes through an exit end of the optical fiber cable 5, the back scatter type temperature sensor 205B analyzes characteristics of light that is reflected back, i.e., back scattered, from various portions of the optical fiber 5 towards the beam splitter 25 as a result of the Brillouin scattering that occurs in the optical fiber cables 5. Accordingly, the back scatter type temperature sensor 205B determines temperatures of rooms A and B by comparing the characteristics of light that is back scattered from portions of the optical fiber cables 5 in rooms A and B, respectively, to the characteristics of the corresponding light initially emitted by the laser 1. According to at least one example embodiment, both the initial light emitted by the laser 1 and the back scattered light reflected back from the portions of the optical fiber cable 5 in Rooms A and B may be obtained as the diagnostic signal 22A.

According to at least some example embodiments, light characteristics that may be analyzed for determining temperature as discussed above with reference to FIGS. 2A and 2B include, for example, power, intensity, wavelength and/or frequency of the light.

According to at least one example embodiment, the laser depletion type temperature sensor 205A and the back scatter type temperature sensor 205B may respectively supply read signals indicative of the characteristics of lights initially emitted by the laser 1 and lights that are depleted or back scattered as a result of Brillouin scattering to a processing device. Further, the processing device can use the read signals to derive temperature measurements from the signals in accordance with known methods. Alternatively, according to at least one example embodiment, the laser depletion type temperature sensor 205A and/or the back scatter type temperature sensor 205B may include processing unit that includes hardware, or hardware and software, configured to derive temperature measurements from the read signals.

According to at least some example embodiments, the laser depletion type temperature sensor 205A and the back scatter type temperature sensor 205B may be used in very large structure including, for example, a turbine building of a nuclear power plant. Accordingly, the total lengths of the optical fiber cables 5 of the temperature monitoring devices 205A and 205B may be many feet long. As is discussed above, Brillouin scattering is temperature dependent since the phonons are thermally generated. Accordingly it is desirable to determine the location where these phonons are generated in the optical fiber cables 5 of temperature monitoring devices so that spatial locations in the plant can be measured and the proper signal architecture can be used to prevent spurious measurement of a steam leak. Consequently, in accordance with at least some example embodiments, the optical fiber cables 5 used in the laser depletion type temperature sensor 205A and/or the back scatter type temperature sensor 205B may have different cable core sizes corresponding to different portions of the cable. For example, according to at least one example embodiment, the light signal generated by the laser 1 is added to a large core fiber and then is spliced to a smaller core fiber. For example, the spool of small core fiber may be configured to yield intensities above the Brillouin Scattering threshold when there is a temperature rise, while the larger core fiber may be configured to yield intensities below the Brillouin Scattering threshold. Example arrangements of these optical fiber cables which have different core sizes spliced together will be discussed in greater detail below with reference to FIGS. 3A and 3B.

Figure 3A:
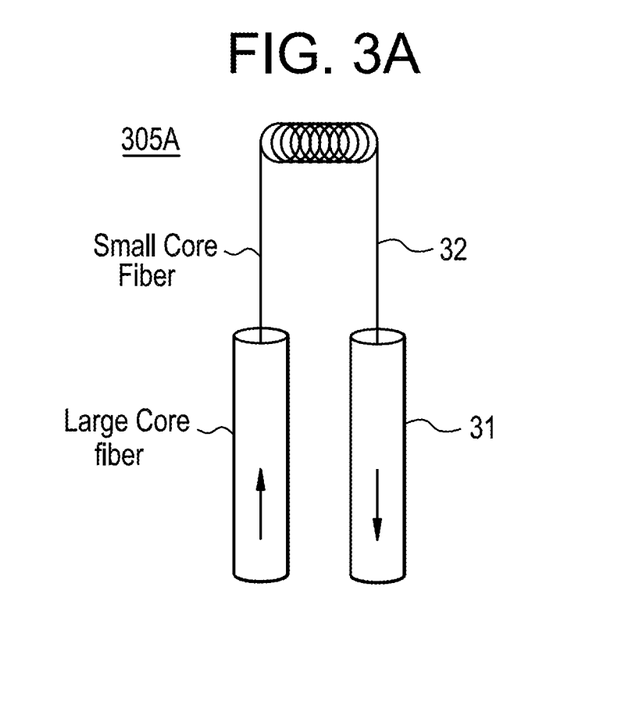
FIG. 3A is a diagram illustrating an example arrangement of a first optical fiber cable for use in a laser depletion type temperature sensor.
Figure 3B:
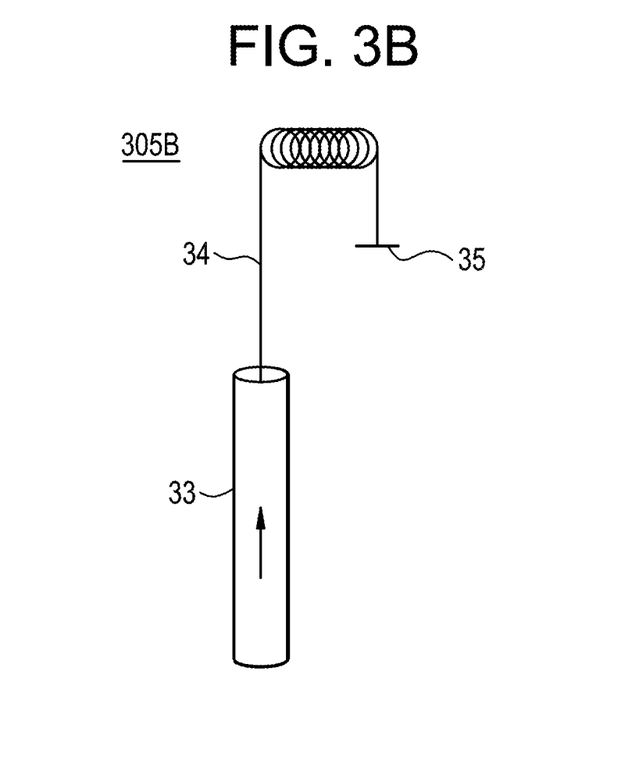
FIG. 3B is a diagram illustrating an example arrangement of a second optical fiber cable for use in a back scatter type temperature sensor

For example, FIG. 3A is a diagram illustrating an example arrangement of a first optical fiber cable 305A for use in a laser depletion type temperature sensor, and FIG. 3B is a diagram illustrating an example arrangement of a second optical fiber cable 305B for use in a back scatter type temperature sensor. For example, the optical fiber cables 5 of the laser depletion type temperature sensor 205A may have the structure of the optical fiber cable arrangement 305A illustrated in FIG. 3A, and the optical fiber cables 5 of the back scatter type temperature sensor 205B may have the structure of the optical fiber cable arrangement 305B illustrated in FIG. 3B.

Referring to FIG. 3A, the first optical fiber cable 305A includes large fiber sections 31 where a cross-sectional diameter of the first optical fiber cable 305A is large, and a small fiber section 32 where the cross-sectional diameter of the optical fiber cable is smaller than that of the large fiber sections 31.

According to at least one example embodiment, when implemented as the optical cables 5 of the laser depletion type temperature sensor 205A, the large fiber sections 31 correspond to portions of the first optical fiber cable 305A that exist between the laser 1 and the area being monitored by the laser depletion type temperature sensor 205A and portions of the first optical fiber cable 305A that exist between the area being monitored and the signal receivers 21; and the small fiber sections 32 correspond to a sensing portion of the first optical fiber cable 305A which is a portion of the first optical fiber cable 305A located at the area being monitored by the laser depletion type temperature sensor 205A. Consequently, due to the increased core size of large fiber sections 31, the chances of light emitted from the laser 1 experiencing Brillouin scattering are reduced or, alternatively, eliminated with respect to portions of the first optical fiber cable 305A where the light is traveling from the laser 1 to the area being monitored, and portions of the first optical fiber cable 305A where the depleted light is traveling from the area being monitored to the signal receivers 21. Further, due to the decreased core size of small fiber section 32, the occurrence of Brillouin scattering may be limited to portions of the first optical fiber cable 305A that are located in the area being monitored. The above-referenced arrangement of the optical fiber cable 305A helps to ensure that a temperature detected by the laser depletion type temperature sensor 205A is a temperature of the area being monitored, and that the detection is not substantially affected by the temperature of another area along the path of the first optical fiber cable 305A.

Similarly, referring to FIG. 3B, the second optical fiber cable 305B includes a large fiber section 33 where a radius of the core of the second optical fiber cable 305B is large, and a small fiber section 34 where the radius of the core of the second optical fiber cable 305B is smaller than that of the large fiber section 33.

According to at least one example embodiment, when implemented as the optical cables 5 of the back scatter type temperature sensor 205B, the large fiber sections 33 correspond to portions of the second optical fiber cable 305B that exist between the laser 1 and the area being monitored by the back scatter temperature monitoring device 205B, and the small fiber sections 34 correspond to a sensing portion of the second optical fiber cable 305B which is a portion of the second optical fiber cable 305B located at the area being monitored by the back scatter type temperature sensor 205B. As is discussed above with reference of FIGS. 2A and 2B, the back scatter type temperature sensor 205B measures back scattered light. Thus, the back scatter type temperature sensor 205B does not include receivers 21. Consequently, according to at least one example embodiment, the optical fiber cable 305B differs from the optic cable 305A in that the optic cable 305B may terminate at a point 35 and does not necessarily include a second large fiber section beyond the area being monitored. Thus, in the same manner discussed above with respect to the first optical fiber cable 305A, the above-referenced arrangement of the second optical fiber cable 305B helps to ensure that a temperature detected by the back scatter type temperature sensor 205B is a temperature of the area being monitored, and that the detection is not substantially affected by the temperature of a different area along the path of the second optical fiber cable 305B.

According to at least one example embodiment, the small fiber sections 32 and 34 may be of the 62.5/125 fiber size. This refers to the fiber cable core being 62.5 microns in diameter and the fiber cladding being 125 microns. The large fiber sections 31 and 33 may be comprised of other claddings and sheath members creating overall cross-sectional diameters anywhere from 2.7 mm to 10 mm. The diameters of the large fiber sections 31 and 33 may, for example, depend on an amount of members. According to at least one example embodiment, cross-sectional diameters of the large fiber sections 31 and 33 may be, for example, up to 25 times larger, 25 times larger, between 25-80 times larger, 80 times larger or more than 80 times larger than the cross-sectional diameters of the small fiber sections 32 and 34.

According to at least some example embodiments, the laser depletion type temperature sensor 205A and the back scatter type temperature sensor 205B may be used to detect, or provide information for detecting, large, rapid temperature changes indicative of, for example, a steam leak in a turbine building of a nuclear plant. Further, it may be desirable for the laser depletion type temperature sensor 205A and the back scatter type temperature sensor 205B to use pulses of light that are sufficiently long in order to provide the level of scattering needed to measure the temperature-dependent Brillouin scattering phenomenon, since scattering strength rises along with light pulse length. Further, the light pulse length used by the laser depletion type temperature sensor 205A and/or the back scatter type temperature sensor 205B may be chosen such that pulse length that would result in optional scattering strength from the small core portion of the optical fiber cable of the monitoring device (i.e. small fiber section 32 or small fiber section 34). For example, the input pulse length of the laser 1 may be chosen to ensure sufficient scattering strength for good signal to noise ratio. For example, according to at least one example embodiment, the lasers 1 (e.g. laser pumps) of the laser depletion type temperature sensor 205A and the back scatter type temperature sensor 205B may operate at a center wavelength of 1064 nm. Pulses could be created at a repetition rate of 1 kHz with pulse widths of 20-40 ns. As was stated earlier the input pulse length of the laser 1 may be calibrated, in accordance with known methods, to ensure sufficient scattering strength for good signal to noise ratio.

Example structures used to increase the provision of heat to optical fiber cables will now be discussed in greater detail below with reference to FIGS. 4A-E.

FIGS. 4A-4E are diagrams illustrating different example structures for enhancing optical fiber cable heat reception. According to at least one example embodiment, the structures illustrated in FIGS. 4A-4E may be applied to the small fiber sections 32 and 34 of the optical fiber cables 305A and 305B used with the laser depletion type temperature sensor 205A and/or the back scatter type temperature sensor 205B.

Figure 4A:
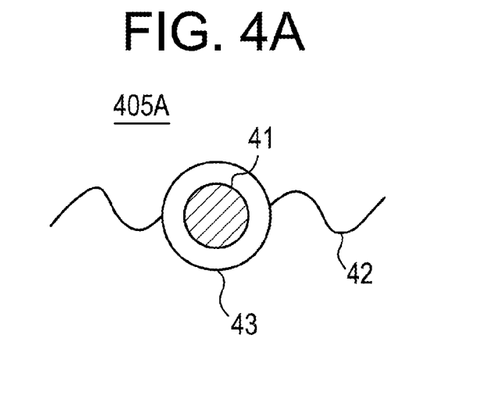
FIGS. 4A-4E are diagrams illustrating different example structures for enhancing optical fiber cable heat reception.
Figure 4B:
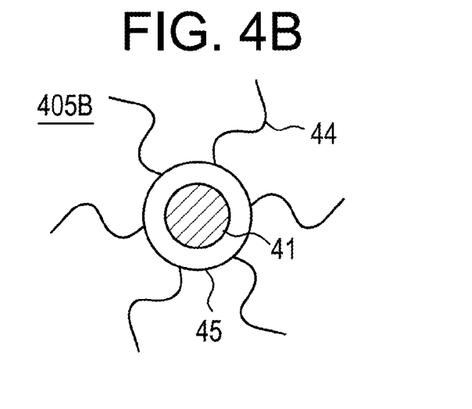

For example, FIGS. 4A and 4B show first and second fiber structures 405A and 405B. FIGS. 4A and 4B illustrate a cross section of an optical fiber cable 41. The optical fiber cable 41 represents, for example, the first small fiber section 32 of the first optical fiber cable 305A and the small fiber section 34 of the second optical fiber cable 305B. Referring to FIG. 4A, the first fiber structure 405A includes a jacket 43 enclosing optical fiber cable 41. Further, two protrusions 42 are attached to the jacket 43. According to at least one example embodiment, any number of protrusions may be used. For example, the second fiber structure 405B includes the optical fiber cable 41 enclosed by jacket 45 which is attached to 6 protrusions 44.

The protrusions 42 and 44 may have any shape that increases the amount of ambient heat delivered to the optical fiber 41 via the jacket 43 and 45. Example shapes for the protrusions 42 and 44 may include fibers, wires and ribbons. Further, the jackets 43 and 45 and the protrusions 42 and 44 may be composed of any material or combination of materials that have high heat transfer properties including, for example, metals Fe, Cu, or Al and non-metals graphite and SiC.

Figure 4C:
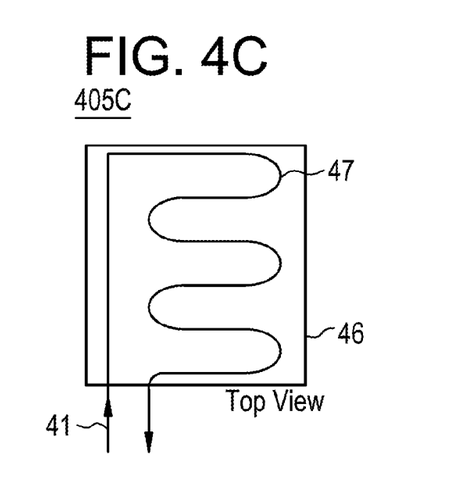
Figure 4D:
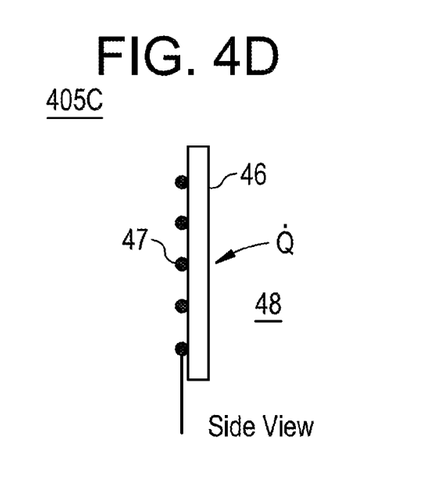

As another example, FIGS. 4C and 4D illustrate various views of a fiber arrangement 405C that includes a conductive plate 46. For example, the optical fiber cable 41 may be attached, via an adhesive or fastening device 47, to the surface of the conductive plate 46. Further, the optical fiber cable 41 may be arranged such that a substantial portion of the optical fiber cable 41 contacts or is close proximity with the plate. Accordingly, heat Q 48 absorbed by the conductive plate 46 is transferred to the optical fiber cable 41. In order to facilitate this transfer, the conductive plate 46 may be composed of any material or combination of materials that has high heat transfer properties including, for example, metals Fe, Cu, or Al and non-metals graphite and SiC.

Figure 4E:
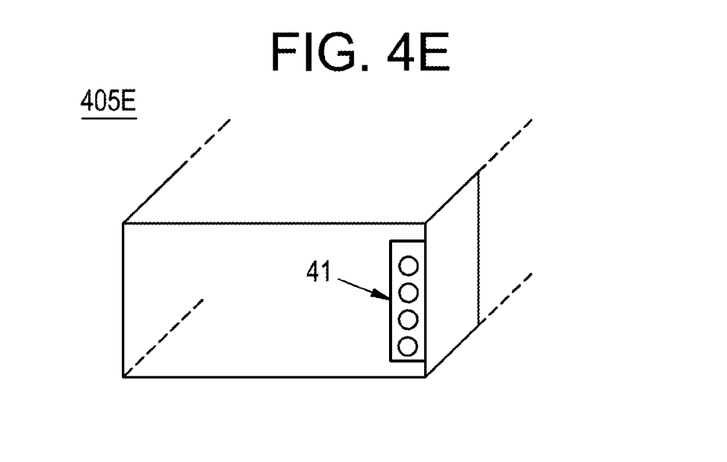

As another example, FIG. 4E illustrates a vent structure 405E that includes the optical fiber cable 41. The vent structure 405E may be used as a vent in a large room including, for example, a turbine building of a nuclear plant. Accordingly, as gas travels through the vent structure 405E, heat from the gas may be absorbed by the optical fiber cable 41.

Though the arrangements and structures illustrated in FIGS. 4A-4E are provided as examples, any arrangement or structure that increases the delivery of ambient heat to an optical fiber cable, including for example the small fiber section 32 of the first optical fiber cable 305A and/or the small fiber section 34 of the second optical fiber cable 305B, may be used. Accordingly, the Brillouin scattering phenomenon which is used to determine temperatures may be more easily induced, particularly at the locations of the small fiber sections 32 and 34.

As is discussed above, one example application of the temperature monitoring devices according to at least some example embodiments is the detection of sharp rises in temperature in very large, well-ventilated areas including, for example, a turbine building of a nuclear power plant. An example system that uses this temperature information to detect dangerous conditions and to respond by taking corrective measures will now be discussed in greater detail below with reference to FIGS. 5 and 6.

Example Temperature Change Detection System

Figure 5:
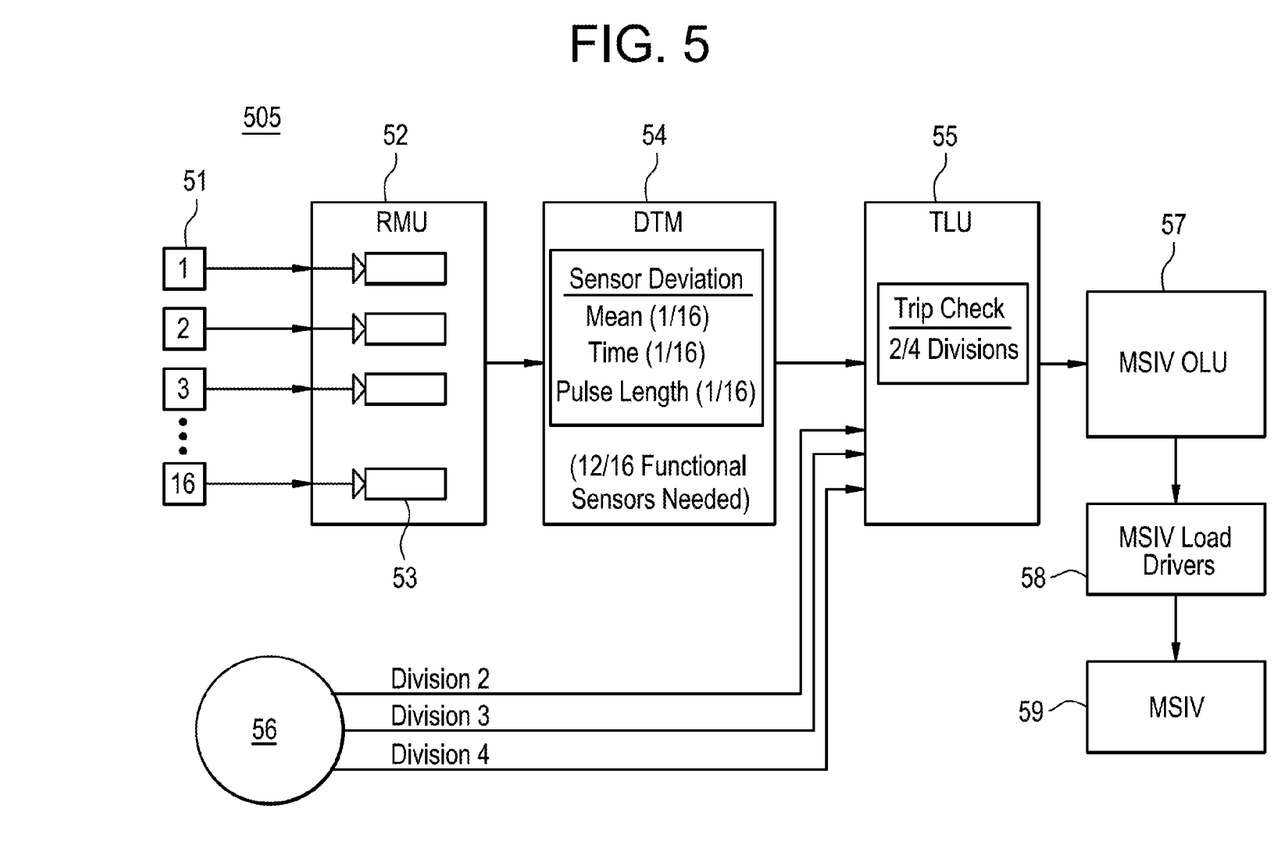
FIG. 5 is a diagram illustrating a temperature change detection system (TCDS).
Figure 6A:
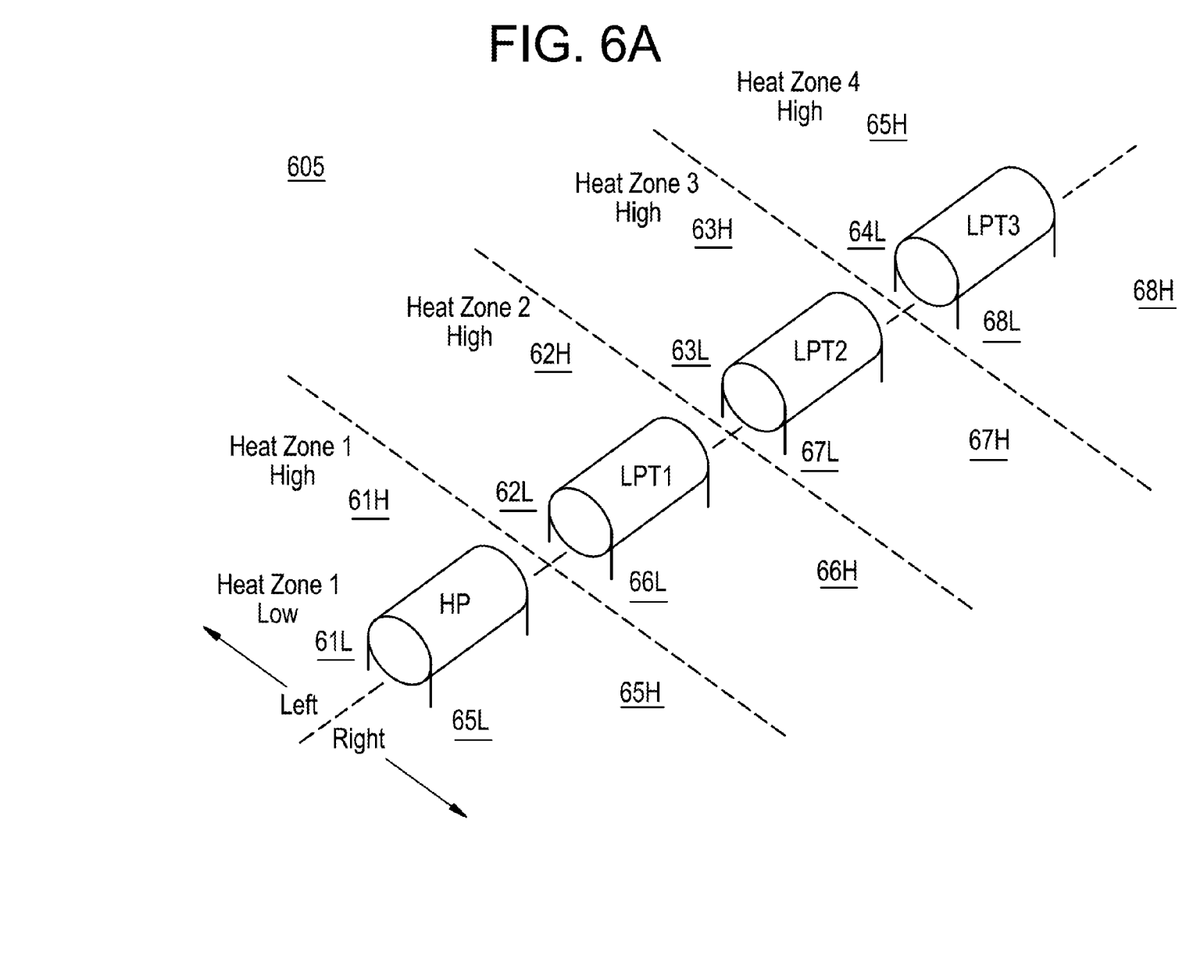
FIG. 6A is a diagram illustrating an example arrangement of a turbine building in a nuclear power plant.
Figure 6B:
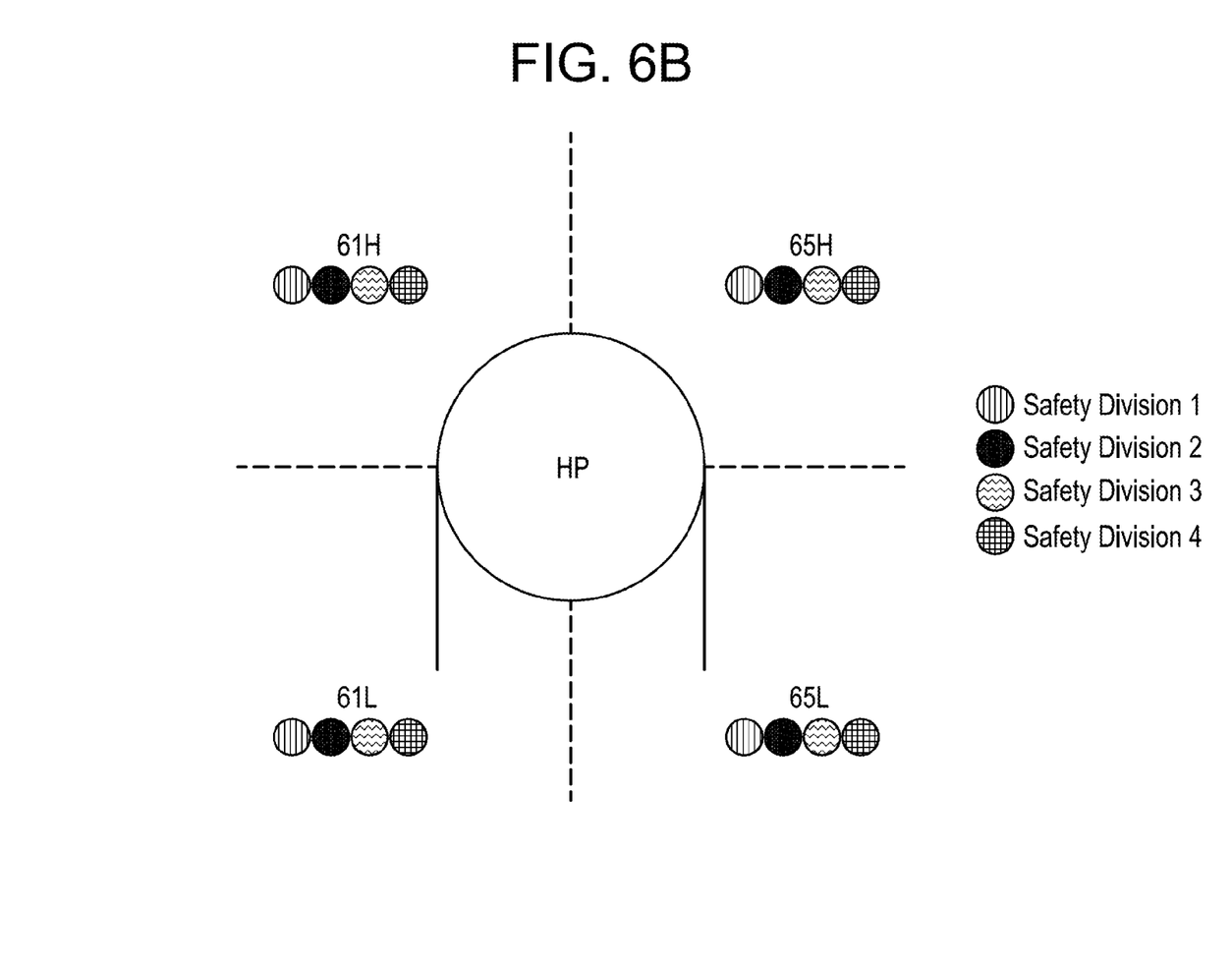
FIG. 6B is a diagram illustrating an example arrangement of one of the plurality of heat zones included in the arrangement illustrated in FIG. 6A.

FIG. 5 is a diagram illustrating a temperature change detection system (TCDS) 505 according to at least one example embodiment. The TCDS 505 will be discussed with respect to an example in which the TCDS 505 is a reactor protection system (RPS) for use with a turbine building of a nuclear power plant. However, according to at least some example embodiments, the protection system may be deployed in spaces other than nuclear power plants.

FIG. 6A is a diagram illustrating an example arrangement of a turbine building 605 in a nuclear power plant from a perspective view. FIG. 6B is a diagram illustrating an example arrangement of one of a plurality of heat zones included in the arrangement illustrated in FIG. 6A.

Referring to FIG. 5, FIG. 5 shows an example of including Brillouin scattering sensors in a Reactor Protection System (RPS) in a manner that meets the reliability expected in a nuclear safety system. In the example illustrated in FIG. 5, the TCDS 505 is applied to the turbine building 605, which is illustrated in FIG. 6A.

Referring to FIG. 6A, according to at least one example embodiment, the TCDS 505 include 4 safety divisions, and each of the four safety divisions may monitor temperatures in a plurality of spatially divided measurement areas, e.g., cells, of the turbine building 605. For example, as is illustrated in FIG. 6A, the turbine building 605 may be divided spatially into 16 cells. According to at least one example, embodiment, each one of the 4 safety divisions may cover the same cells. For example, as will be explained in greater detail below, each of the 16 cells of the turbine building 605 may include at least one temperature sensor from the first safety division, at least one temperature sensor from the second safety division, at least one temperature sensor from the third safety division, and at least one temperature sensor from the fourth safety division.

As is illustrated in FIG. 6A the turbine building 605 may include four turbines including a high power turbine HP, a first low power turbine LP1, a second low power turbine LP2 and a third low power turbine LP3. Further, the turbine building 605 is divided into 4 heat zones corresponding, respectively, to the four turbines. In the example illustrated in FIG. 6A, heat zone 1 corresponds to the high power turbine HP, heat zone 2 corresponds to the first low power turbine LPT1, heat zone 3 corresponds to the second low power turbine LPT2, and heat zone 4 corresponds to the third low power turbine LPT3. Further, each of the 4 heat zones may be further divided into left and right sections. Thus, as is illustrated by the dashed partial boxes in FIG. 6A, the turbine building 605 may be divided into 8 sections. Additionally, each of the 8 sections may be further divided into upper and lower cells where the upper cells are located above the lower cells in a vertical direction relative to a floor of the turbine building 605. This is why, according to the example illustrated in FIG. 16, the turbine building 605 is divided into a total of 16 cells.

Returning to FIG. 6A, in the example illustrated in FIG. 6A, the 16 cells of the turbine building 605 include: the high and low cells for the first heat zone on the left side 61H and 61L, the high and low cells for the second heat zone on the left side 62H and 62L, the high and low cells for the third heat zone on the left side 63H and 63L, the high and low cells for the fourth heat zone on the left side 64H and 64L, the high and low cells for the first heat zone on the right side 65H and 65L, the high and low cells for the second heat zone on the right side 66H and 66L, the high and low cells for the third heat zone on the right side 67H and 67L, and the high and low cells for the fourth heat zone on the right side 68H and 68L.

FIG. 6B shows the upper and lower cells of each of the left and right sections of heat zone 1 corresponding to the high power turbine HP (61H, 61L, 65H and 65L). As is discussed above, each of the 16 cells may include at least one sensor from each of the four safety divisions. This is illustrated by FIG. 6B which shows hatched circles corresponding to temperature sensors of each of the four safety divisions located in each of the 4 cells of heat zone 1. Heat zones 1-3 may have the same arrangement illustrated in FIG. 6B with respect to heat zone 1.

Though, the turbine building 605 TCDS 505 are described with respect to an example in which the includes TCDS 505 includes 4 safety divisions and the turbine building 605 includes 4 heat divisions and 16 cells, the TCDS 505 may have any desired number of safety divisions, and the turbine building 605 may have any desired number of heat divisions and/or cells.

Referring to FIG. 5, the TCDS 505 may include a group of Brillouin sensors, a remote multiplexer unit (RMU), and a digital trip monitor (DTM) for each safety division of the TCDS 505. In the example illustrated in FIG. 5, for the purpose of simplicity, only the first group of Brillouin sensors 51 include in the first safety division, the first RMU 52 included in the first safety division, and the first DTM 54 included in the first safety division are illustrated in the TCDS 505. However, because the TCDS 505 includes four safety divisions, the TCDS 505 also includes second through fourth groups of Brillouin sensors, second through fourth RMUs, and second through fourth DTMs, all of which are represented together in FIG. 5, for the purpose of simplicity, as other devices 56. The first through fourth DTMs output trip signals on four separate safety division channels, respectively. The TCDS 505 also includes a trip logic unit (TLU) 55 that receives trip signals through the four safety division channels. Additionally, when implemented as a RPS, the TCDS 505 may further include an MSIV output load unit (OLU) 57, MSIV Load Drivers 58, and an MSIV 59.

An example method of operation the TCDS 505 will now be discussed in greater detail below with reference to FIG. 7. For the purpose of simplicity, division-specific operations included in the method illustrated in FIG. 7 will be explained primarily with respect to the first division by referring to the first group of Brillouin sensors 51, first RMU 52, and first DTM 54. However, the second through fourth groups of Brillouin sensors, the second through fourth RMUs, and the second through fourth DTMs associated with the second through fourth safety divisions may have the same structure and operation as that described herein with respect to the first group of Brillouin sensors 51, first RMU 52, and first DTM 54 of the first safety division.

Figure 7:
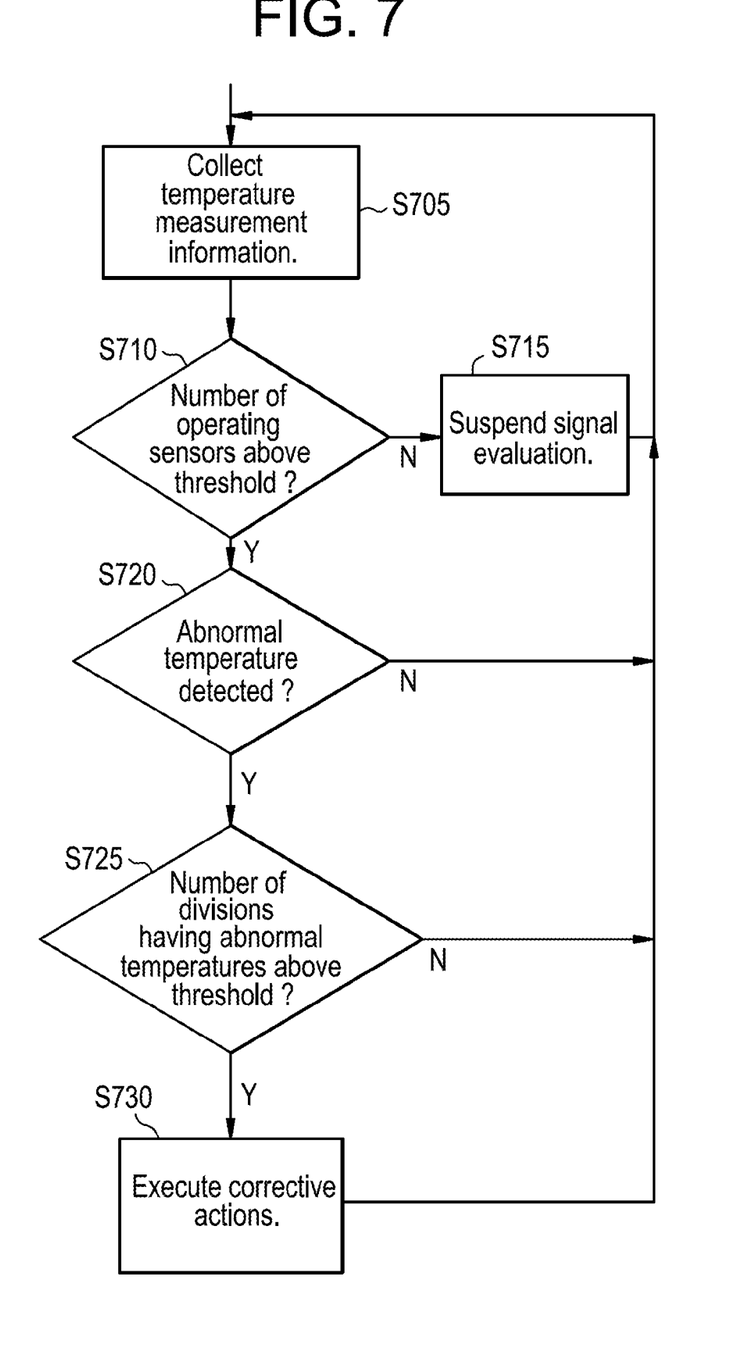
FIG. 7 is a flow-chart illustrating an example method of operation the TCDS of FIG. 5.

FIG. 7 is a flow-chart illustrating an example method of operation the TCDS 505. Referring to FIG. 7, in step S705, the TCDS 505 collects temperature measurement information. For example, with respect to the first safety division, in step S705, some or all of the temperature sensors of the first group of Brillouin sensors 51 of the first safety division generate temperature measurement information.

According to at least one example embodiment, the first group of Brillouin scattering sensors 51 may include a plurality of temperature sensors that collect temperature information from different locations in the first safety division of the turbine building 605. According to at least one example embodiment, the number of temperature sensors included the first group of Brillouin scattering sensors 51 may be set, for example, based on the number of cells being monitored in the first safety division. Thus, in the example illustrated in FIGS. 5 and 6, the group of Brillouin scattering sensors 51 includes 16 temperature sensors located, respectively, in the 16 spatially divided cells 61L-68H illustrated in, and discussed above with reference to, FIG. 6A. According to at least one example embodiment, each of the plurality of temperature sensors in the first group of Brillouin scattering sensors 51 may be configured to collect temperature information using the Brillouin scattering phenomenon according to known methods.

According to at least one example embodiment, each of the plurality of temperature sensors in the first group of Brillouin scattering sensors 51 may have the structure and operation of either one of the laser depletion type temperature sensor 205A or the back scatter type temperature sensor 205B described above with reference to FIGS. 2A-4E.

According to at least one example embodiment, the temperature measurement information generated by one or more of the sensors from among the first group of Brillouin sensors 51 in step S705 may be the same information described above with reference to FIGS. 2A and 2B as being generated by the laser depletion type temperature sensor 205A and/or the back scatter type temperature sensor 205B. Accordingly, the temperature measurement information generated by one or more of the sensors from among the first group of Brillouin sensors 51 in step S705 may be calculated temperature values corresponding to the measuring positions of the one or more sensors, or information from which the temperature values can be calculated.

According to at least one example embodiment, in step S705, the sensors from among the first group of Brillouin sensors 51 that generated temperature information may provide the generated temperature information to the first RMU 52.

According to at least one example embodiment, the temperature information generated in step S705 may be received at the RMU 52 as light information. For example the light information may be light, provided from the first group of Brillouin sensors 51 that has been depleted or back scattered as a result of Brillouin scattering. Accordingly, the RMU 52 may include a plurality of data inputs 53 which are configured to receive light information from the temperature sensors of the first group of Brillouin scattering sensors 51. For example, the data inputs 53 may be laser receptacles.

Alternatively, the temperature measurement information generated by one or more of the sensors from among the first group of Brillouin sensors 51 in step S705 and received by the first RMU 52 may be calculated temperature values or intermediate data, such as light characteristic comparison values, from which temperature values may be calculated. In this case, the data inputs 53 may be laser receptacles or electrical data inputs.

In step S705, the first RMU 52 may also provide the received temperature information to the first DTM 54 for further evaluation.

In step S710, the TCDS 505 compares the number of sensors that generated temperature data for the first safety division to a threshold sensor number.

For example, the first DTM 54 may determine whether or not the number operating of temperature sensors from among the first group of Brillouin scattering sensors 51 is a above a threshold sensor number. For example, when the threshold number is 11, the first DTM 54 may determine whether or not at least 12 of the 16 sensors from among the first group of Brillouin scattering sensors 51 are operating. The first DTM 54 may determine which temperature sensors are operating by determining the temperature sensors from which the first DTM 54 is receiving light information via the first RMU 52. For example, for a given measurement interval, the first DTM 54 may consider a temperature sensor for which no light information was received at the first DTM 54 during the measurement interval to be inoperative.

If, in step S710, the TCDS 505 determines that the number of operating temperature sensors does not exceed the threshold sensor number, the protection system proceeds to step S715.

In step S715, the TCDS 505 may suspend evaluation of the measurement signals corresponding to the first safety division.

For example, if the first DTM 54 determines that the number of operating sensors, from among the 16 sensors of the first group of Brillouin scattering sensors 51, does not exceed the threshold sensor number of 11, the first DTM 54 may suspend evaluation of the temperature information generated in step S705, and the first DTM 54 may also generate an alert signal notifying an operator of the plant including the turbine building 605 that several sensors from among the first group of Brillouin sensors 61 in the first safety division are inoperative.

According to at least one example embodiment, in step S715 the TCDS 505 may suspend signal evaluation only with respect to the safety division for which the number of operating sensors fails to exceed the threshold sensor number, while allowing signal evaluation to proceed for safety divisions having numbers of operating sensors that exceed the threshold sensor number. For example, the TCDS 505 may return to step S710 to reevaluate the number of operating sensors until the number of operating system exceeds the threshold sensor number.

If, in step S710, the TCDS 505 determines that the number of operating temperature sensors does exceed the threshold number, the protection system proceeds to step S720.

In step S720 the TCDS 505 determines whether or not an abnormal temperature was detected in the first safety first division.

If, in step S720, the TCDS 505 determines that no abnormal temperatures were detected in the first safety division, the TCDS 505 returns to step S705 to collect new temperature measurement information.

If, in step S720, the TCDS 505 determines that one or more abnormal temperatures were detected in the first safety division, the TCDS 505 proceeds to step S725. Further, the TCDS 505 may additionally issue an alert notifying an operator of the protection system of the abnormal temperature so the abnormal temperature may be investigated.

For example, according to at least one example embodiment, in accordance with known methods, in step S720 the first DTM 54 may determine temperature values based on the temperature information received through the RMU 52 from sensors in the first group of Brillouin scattering sensors 51. Further, the first DTM 54 may calculate a mean of the temperature values determined from the temperature information received during a given measurement iteration from sensors in the first group of Brillouin scattering sensors 51. Further, according to at least one example embodiment, the first DTM 54 may perform several measurement iterations by periodically repeating the process of (i) determining temperature values from the temperature information received from sensors of the first group of Brillouin scattering sensors 51 and (ii) calculating the mean of the derived temperature values, using, for example, measurement intervals of every half-second or every 1-5 seconds.

Further, the first DTM 54 may also calculate a running average of the periodically calculated mean temperature values using a sliding window. For example, the sliding window may be, 10 minutes or less, 10 minutes to 30 minutes, or 30-60 minutes long, and the running average may be calculated by averaging only periodically calculated mean temperature values corresponding to time intervals that fall within the sliding window. The first DTM 54 may update the running average at every measurement iteration.

Further, in step S720 the first DTM 54 may compare each of the individual periodically generated temperature values of a given measurement iteration to the current running average in order to identify outlying temperature values. If, for a given measurement iteration, one or more of the periodically determined temperature values corresponding to temperature information received from the sensors of the first group of Brillouin scattering sensors 51 exceeds the running average temperature value by more than a threshold difference, the exceeding temperature may be considered abnormal, the first DTM 54 may send a trip signal to the TLU 55, and the TCDS 505 may proceed to step S725.

The threshold difference may be set in accordance with the preferences of the operator of the TCDS 505. Higher threshold differences may result in less false trip signals, but slower detection of abnormal events. Lower threshold differences may result in faster detection of abnormal events, but higher numbers of false trip signals.

By using the running average as a comparison point rather than a set temperature value, daily and seasonal temperature changes will be accounted for automatically, and thus the number of spurious, season or weather-related trip signals generated by the first DTM 54 may be reduced or, alternatively, eliminated.

Though, for the purpose of simplicity, steps S705-S720 are described with reference only to the first safety division, the protection system also performs the same steps as steps S705-S720 for each of the second through third safety divisions. According to at least one example embodiment, the TCDS 505 may perform steps S705-S720 for each of the first through fourth safety divisions simultaneously.

In step S725, the TCDS 505 determines whether a number of safety divisions that have abnormal temperatures exceeds a threshold number. For example, in step S725, the TLU 55 may employ a two out of four voting logic that determines whether or not a number of safety divisions that sent trip signals to the TLU 55 via the first through fourth safety information channels exceeds a trip threshold of one.

If, in step S725, the TCDS 505 determines that a number safety divisions that have abnormal temperatures does not exceed the threshold number, the TCDS 505 returns to step S705 to collect new temperature measurement information.

If, in step S725, the TCDS 505 determines that a number safety divisions that have abnormal temperatures does exceed the threshold number, the TCDS 505 proceeds to step S730 to perform corrective actions.

For example, when implemented as a RPS, corrective measures that the TCDS 505 takes in step S730 may include closing the MSIV 59. According to at least one example embodiment, the TLU 55 may trigger closure of the MSIV 59 when at least two of the four safety division channels provide trip signals. For example, in the example illustrated in FIG. 5, when at least two of the four safety division channels provide trip signals to the TLU 55, the TLU 55 sends a notification signal to the MSIV OLU 57, which responds to the notification signal by sending a trigger signal to the MSIV Load Drivers 58, which respond to the trigger signal by closing the MSIV 59. Closure of the MSIV 59 stops the steam flow in the turbine building 605, thus limiting the damage caused by a steam leak event.

Accordingly, the TCDS 505 may be used to detect steam leaks in a turbine building of a nuclear power plant despite the difficulties presented by turbine buildings being very large and well-ventilated, and the difficulties presented by hourly and seasonal changes in ambient temperature.

Though the TCDS 505 and method of operating the TCDS 505 are discussed above with respect to examples in which the TCDS 505 is applied to the turbine building of a nuclear power plant, according to at least some example embodiments, the TCDS 505 is not limited to use in nuclear power plants. Other example applications for the TCDS 505 include oil refineries and sodium fast reactors. Oil refineries, as well as many other chemical facilities, are not contained within a building. Accordingly, it may be difficult to envelope outdoor environments due to the large temperature swings between day and night. However, as is discussed above, the TCDS 505 can be used to benchmark the baseline temperature reading due to the ambient environment, but can also detect if there is an unexpected deviation in temperature. Sodium fast reactors provide another application for the TCDS 505 because of the nature of sodium fires. The heat from sodium fires will rise to, or be generated on, the ceiling and it is often difficult to find the location of the leaking sodium. However, as is discussed above the TCDS 505 is able to account for the background temperature of the area while using a network of sensors that can detect fine changes in localized areas.

According to at least one example embodiment, the TCDS 505 may be programmed, in terms of software and/or hardware, to perform any or all of the functions described herein as being performed by the TCDS 505 including, for example, operations described with reference to FIG. 7. According to at least one example embodiment, the TCDS 505 may include a TCDS processing unit configured to control the operations of one, some or all of the elements of the TCDS 505 discussed above with reference to FIG. 5 including, for example, the TLU 55, and the DTMs, RMUs and groups Brillouin scattering sensors 51 associated, respectively, with each of the safety divisions the TCDS 505 is configured to monitor. According to at least one example embodiment, the TCDS processing unit may be included in the TLU 55 or in an additional unit of the TCDS 505 (not pictured). The TCDS processing unit may include an instruction memory and one or more processors. As used herein, the term 'processor' refers to a machine including circuitry that is structurally configured to carry out specific operations, or structurally configured to execute instructions included in computer readable code. Examples of the above-referenced processor include, but are not limited to, a microprocessor, a multiprocessor, a central processing unit (CPU), a digital signal processor (DSP), an application specific integrated circuit (ASIC), and a field programmable gate array (FPGA).

Examples of the TCDS 505 being programmed, in terms of software, to perform any or all of the functions described herein as being performed by the TCDS 505 will now be discussed below. For example, the instruction memory may store a program including executable instructions corresponding to any or all of the operations described herein as being performed by the TCDS 505 including, for example, operations described with reference to steps S705-S730 of FIG. 7. According to at least one example embodiment, additionally or alternatively to being stored in the instruction memory of the TCDS processing unit, the program may be stored in a computer-readable medium including, for example, an optical disc, a flash drive, an SD card, etc., and the TCDS 505 may include hardware for reading data stored on the computer readable-medium. Further, the TCDS processing unit may include one or more processors configured to perform any or all of the operations described herein as being performed by the TCDS 505 (including, for example, operations described with reference to steps S4705-S730 of FIG. 7) for example, by reading and executing the executable instructions stored in at least one of the memory unit 230 and a computer readable storage medium loaded into hardware included in TCDS 505 for reading computer-readable mediums.

Examples of the TCDS 505 being programmed, in terms of hardware, to perform any or all of the functions described above with reference to FIG. 4 will now be discussed below. Additionally or alternatively to executable instructions corresponding to any or all of the operations described herein as being performed by the TCDS 505 (including, for example, steps S705-S730 of FIG. 7) being stored in the instruction memory of the TCDS processing unit or a computer-readable medium as is discussed above, the TCDS processing unit may include a circuit that has a structural design dedicated to performing any or all of the operations described herein as being performed by the TCDS 505. For example, the circuit included in the TCDS 505 may be a processor physically programmed to perform any or all of the operations described herein as being performed by the TCDS 505 (e.g., an FPGA or ASIC).

Example embodiments having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed:

1. A temperature change detection apparatus for monitoring temperature change in various portions of a first space comprising:
 a trip logic unit configured to execute a trip operation based on receipt of a trip signal at the trip logic unit;
 a plurality of temperature sensors being configured such that, for each of the plurality of temperature sensors, the temperature sensor includes an optical fiber cable that includes a sensing portion and the temperature sensor is configured to generate light information indicating an amount of Brillouin scattering that occurs within the sensing portion;
 a plurality of monitoring units configured such that, for each one of the plurality of monitoring units, the monitoring unit is,
  connected to temperature sensors from among the plurality of temperature sensors,
  configured to, for each of the temperature sensors to which the monitoring unit is connected,
   determine a temperature value corresponding to the connected temperature sensor based on an amount of Brillouin scattering indicated by the light information generated by the connected temperature sensor, the determined temperature value being indicative of a temperature at a location of the sensing portion of the connected temperature sensor, and
   generate a comparison result based on the determined temperature value and a running average value, and
  configured to generate the trip signal when at least one of the generated comparison results exceeds a threshold value,
  wherein a first optical fiber cable includes a large fiber section and a small fiber section, the first optical fiber cable being the optical fiber cable included in a temperature sensor from among the plurality of temperature sensors, a cross-sectional diameter of the small fiber section being smaller than that of the large fiber section, the small fiber section corresponding to the sensing portion of the first optical fiber cable, the large fiber section corresponding to portions of the first optical fiber cable other than the sensing portion of the first optical fiber cable, and
  wherein the large fiber section includes a first core and the small fiber section includes a second core, a radius of the first core being larger than a radius of the second core.

2. The temperature change detection apparatus of claim 1, wherein the plurality of temperature sensors and the plurality of monitoring units are divided into a plurality of safety divisions such that each safety division includes a different one of the plurality of monitoring units and a different group of temperature sensors from among the plurality of temperature sensors.

3. The temperature change detection apparatus of claim 2, wherein the trip logic unit is configured such that the trip logic unit executes the trip operation when a total number of trip signals received from the monitoring units of the plurality of safety divisions exceeds a trip threshold value.

4. The temperature change detection apparatus of claim 2, wherein for each of the safety divisions, the group of temperature sensors included in the safety division are located, respectively, in a plurality of monitoring areas, the plurality of monitoring areas being located in spatially different areas of the first space.

5. The temperature change detection apparatus of claim 4 wherein, the plurality of temperature sensors are arranged such that, for each of the plurality of monitoring areas, the monitoring area includes at least one temperature sensor from each of the groups of temperature sensors.

6. The temperature change detection apparatus of claim 1, wherein a first sensing portion includes a plurality of protrusions, the first sensing portion is the sensing portion of included in the optical fiber cable that is included in a temperature sensor from among the plurality of temperature sensors, the plurality of protrusions extend outwards from the optical fiber cable in which the first sensing portion is included, and the plurality of protrusions are configured to increase an amount of ambient heat delivered from a monitoring area in which the first sensing portion is located to the first sensing portion.

7. A nuclear plant system comprising:
a turbine building including one or more turbines configured to generate power from steam produced by a boiling water reactor (BWR); and
the temperature change detection apparatus of claim 1, wherein
the first space is the turbine building,
the sensing portions of the plurality of temperature sensors are located in a plurality of monitoring areas, the plurality of monitoring areas being spatially distributed in different locations throughout the turbine building, and
the trip operation includes closing one or more valves.

8. The nuclear plant system of claim 7, wherein the trip operation includes closing a main steam isolation valve (MSIV) of the turbine building.

9. The nuclear plant system of claim 7, wherein the plurality of temperature sensors and the plurality of monitoring units are divided into a plurality of safety divisions such that each safety division includes a different one of the plurality of monitoring units and a different group of temperature sensors from among the plurality of temperature sensors.

10. The nuclear plant system of claim 9 wherein the trip logic unit is configured such that the trip logic unit executes the trip operation when a total number of trip signals received from the monitoring units of the plurality of safety divisions exceeds a trip threshold value.

11. The nuclear plant system of claim 9 wherein, for each of the safety divisions, the group of temperature sensors included in the safety division are located, respectively, in the plurality of monitoring areas.

12. The nuclear plant system of claim 11 wherein, the plurality of temperature sensors are arranged such that, for each of the plurality of monitoring areas, the monitoring area includes at least one temperature sensor from each of the safety divisions.

13. The nuclear plant system of claim 7 wherein, the sensing portion included in the optical fiber cable included in at least one of the plurality of temperature sensors includes a plurality of protrusions that extend outwards from the optical fiber cable and are configured to increase an amount of ambient heat delivered from the monitoring area in which the sensing portion is located to the sensing portion.

14. The plant system of claim 7, wherein,
the turbine building includes at least one ventilation conduit configured to carry at least one of air and other gases into or out of the turbine building, and
the sensing portion included in the optical fiber cable included in at least one of the plurality of temperature sensors is located on an interior or exterior surface of the ventilation conduit.

* * * * *